(12) United States Patent
Elgarat

(10) Patent No.: US 9,734,042 B1
(45) Date of Patent: Aug. 15, 2017

(54) SYSTEM, METHOD, AND COMPUTER PROGRAM FOR AUTOMATED PARAMETERIZED SOFTWARE TESTING

(71) Applicant: Amdocs Software Systems Limited, Dublin (IE)

(72) Inventor: Sharon Elgarat, Kibbutz Mefalsim (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 31 days.

(21) Appl. No.: 14/285,542

(22) Filed: May 22, 2014

Related U.S. Application Data

(60) Provisional application No. 61/827,678, filed on May 27, 2013.

(51) Int. Cl.
*G06F 11/36* (2006.01)
*G06F 11/34* (2006.01)

(52) U.S. Cl.
CPC ...... *G06F 11/3672* (2013.01); *G06F 11/3684* (2013.01); *G06F 11/3438* (2013.01); *G06F 11/3688* (2013.01)

(58) Field of Classification Search
CPC ............. G06F 11/3438; G06F 11/3684; G06F 11/3411; G06F 11/34; G06F 11/36; G06F 11/3664; G06F 11/3688; G06F 11/3692
See application file for complete search history.

(56) References Cited

U.S. PATENT DOCUMENTS

| 5,335,342 | A | * | 8/1994 | Pope et al. ................. 714/38.13 |
| 6,002,869 | A | * | 12/1999 | Hinckley ............ G06F 11/3696 714/35 |
| 7,917,895 | B2 | * | 3/2011 | Givoni et al. ................. 717/124 |
| 8,495,584 | B2 | * | 7/2013 | Beaty et al. .................. 717/127 |
| 2007/0022407 | A1 | * | 1/2007 | Givoni et al. ................. 717/124 |
| 2010/0325492 | A1 | * | 12/2010 | Isaacs et al. .................... 714/38 |
| 2011/0225569 | A1 | * | 9/2011 | Beaty et al. .................. 717/127 |
| 2012/0253745 | A1 | * | 10/2012 | Dhanapal et al. ............ 702/186 |

* cited by examiner

*Primary Examiner* — Emerson Puente
*Assistant Examiner* — Erika Kretzmer
(74) *Attorney, Agent, or Firm* — Zilka-Kotab, PC

(57) ABSTRACT

During execution of a computer program, mouse movements, keyboard inputs, and screen snapshots are recorded and stored in one or more files as a test flow. Next, selected recorded keyboard inputs are replaced with user-specified variable parameters to generate a keyboard testing input, each of the parameters corresponding to a plurality of possible keyboard inputs. Execution is triggered of the test flow including the recorded mouse movements, the recorded screenshots, and the keyboard testing input. If the initially displayed screen is not equivalent to the first screen indicted in the test flow as being the start of the test, the test flow is stopped. Otherwise, the test flow is executed utilizing a random selection of the plurality of possible keyboard inputs of the keyboard testing input. At least one output is provided for the execution of the test flow.

12 Claims, 5 Drawing Sheets

SYSTEM, METHOD, AND COMPUTER PROGRAM FOR AUTOMATED PARAMETERIZED SOFTWARE TESTING

CLAIM OF PRIORITY

This application claims the benefit of U.S. Provisional Application No. 61/827,678, filed May 27, 2013, the entire contents of which are incorporated herein by reference.

FIELD OF THE INVENTION

The present invention relates generally to automated software testing, and particularly to combining recording capabilities with random scenario generation to produce new data permutation tests on existing recorded software execution flows.

BACKGROUND

Software testers are often required to investigate a previously tested software execution flow, to reproduce an existing problem, to retest a fixed bug, and to identify system limitations. To do so, testers typically invest significant effort in performing repeated actions while trying to guess the right data set which would allow identifying the real issue. Software testers have a need for a tool that can quickly capture a testing flow and execute multiple different data permutations utilizing the captured testing flow such that a large amount of results may be generated and analyzed in an efficient manner.

There is thus a need for addressing these and/or other issues associated with the prior art.

SUMMARY

A system, method, and computer program product are provided for automated parameterized software testing. In use, a plurality test steps to test at least one software product associated with a software testing project are performed. Mouse movements associated with each of the plurality of test steps are recorded. Additionally, keyboard inputs associated with each of the plurality of test steps are recorded. Further, snapshots of one or more screen segments associated with one or more of the plurality of test steps are recorded. The recorded mouse movements, the recorded keyboard inputs, and the recorded screenshots, are stored in one or more files as a first test flow. In addition, a selected one or more of the recorded keyboard inputs are replaced with one or more parameters to generate a keyboard testing input, each of the one or more parameters corresponding to a plurality of possible keyboard inputs. Furthermore, execution is triggered of the first test flow including the recorded mouse movements, the recorded screenshots, and the keyboard testing input. Moreover, the first test flow is executed utilizing a random selection of the plurality of possible keyboard inputs of the keyboard testing input. Still yet, at least one output is provided for the execution of the first test flow.

DETAILED DESCRIPTION

Figure 1:
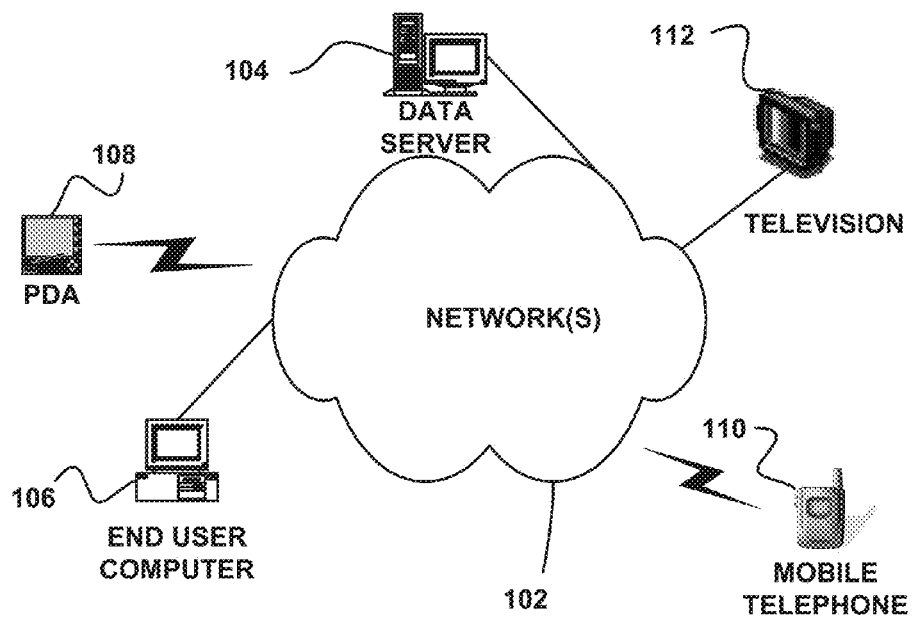
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
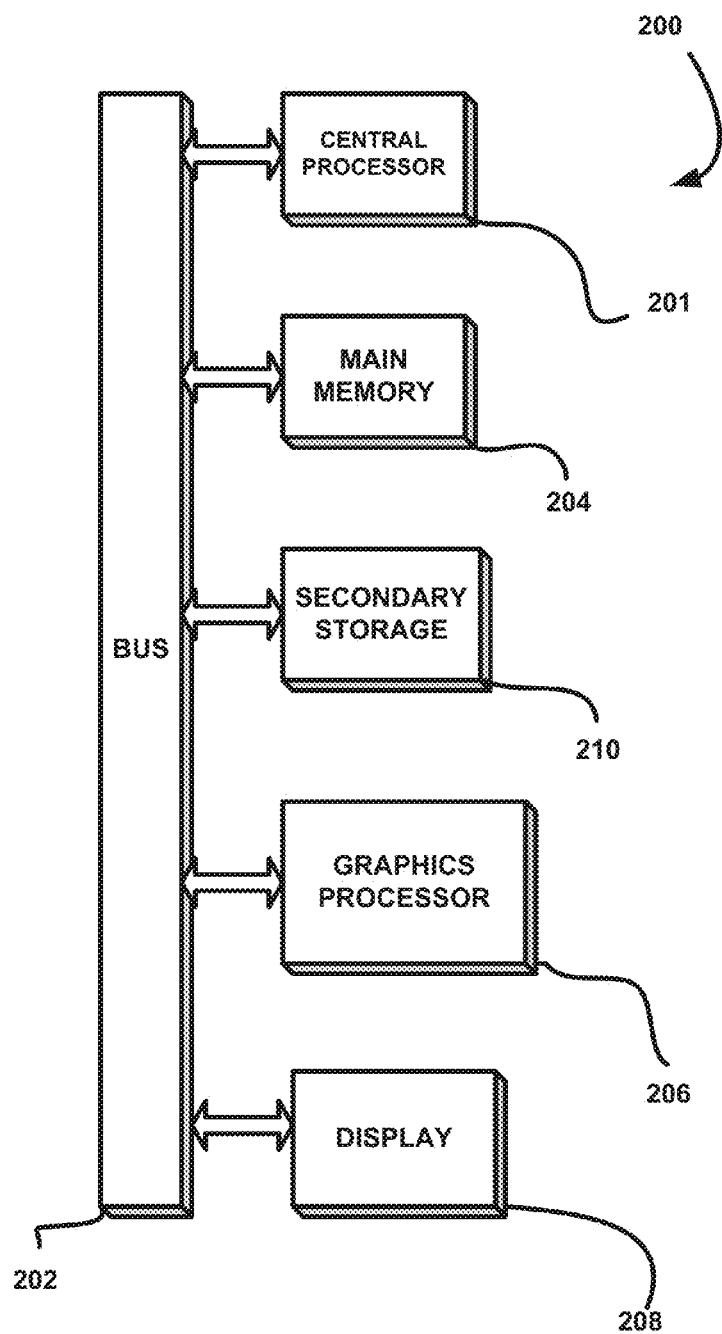
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
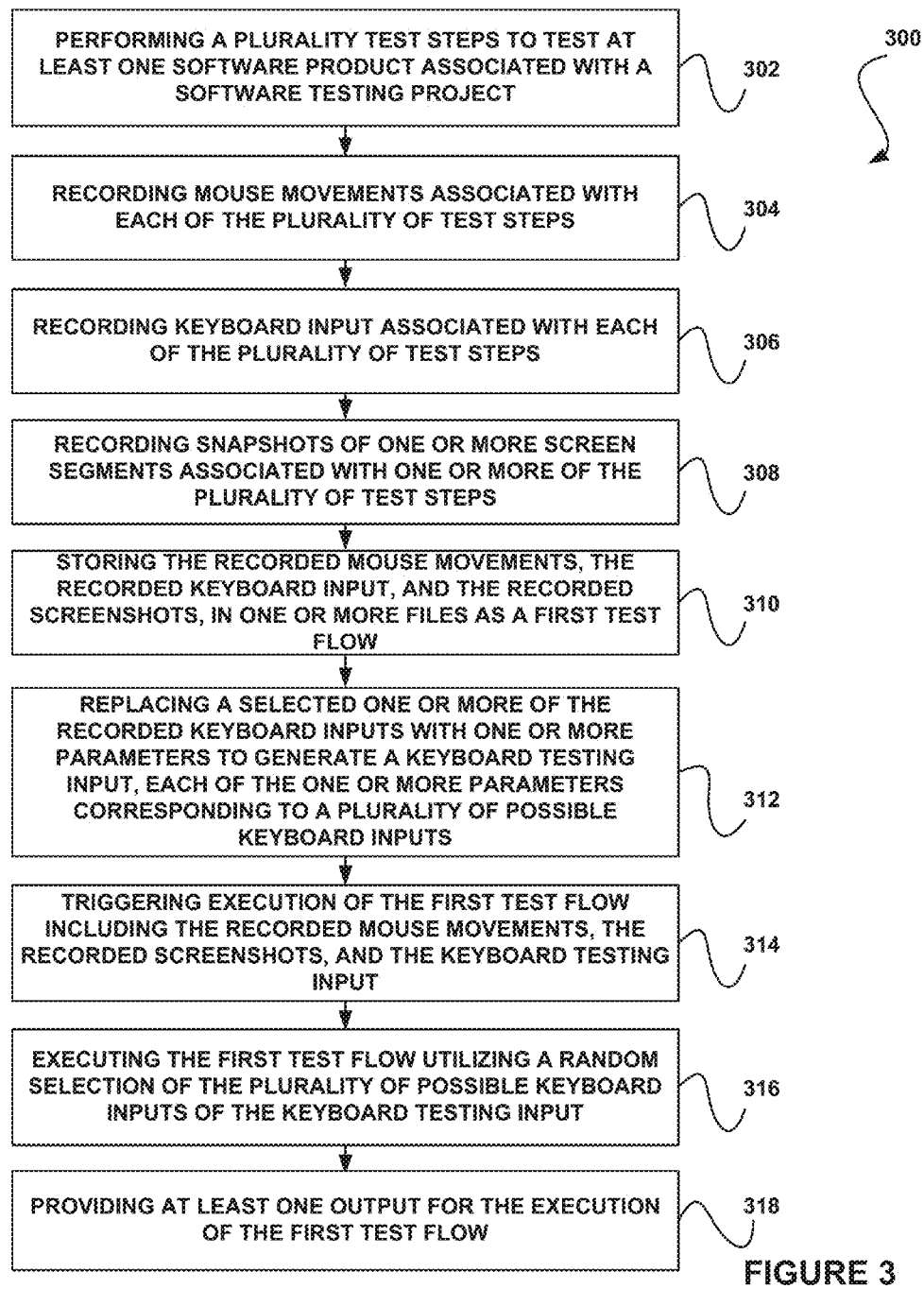
FIG. 3 illustrates a method for automated parameterized software testing, in accordance with one embodiment.

FIG. 3 illustrates a method 300 for automated parameterized software testing, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a plurality test steps to test at least one software product associated with a software testing project are performed. See operation 302. The software product may include any computer code, application, program, module, and/or combinations thereof.

Furthermore, the software product and the software testing project may be associated with any industry. For example, in one embodiment, the software product and/or the software testing project may be associated with a telecommunications service provider.

In addition, any number of steps may be performed. In one embodiment, the number of testing steps may be determined based on one or more test plans.

During performance of the test, mouse movements associated with each of the plurality of test steps are recorded. See operation 304. In this case, the mouse movements may include any and all mouse movements performed by a user (e.g. a tester) during the performance of the test. In the context of the present description, recording may also refer to logging, capturing, storing, and various other actions associated with recording.

Additionally, keyboard inputs associated with each of the plurality of test steps are recorded. See operation 306. The keyboard inputs may include any and all keyboard inputs made by the user (e.g. a tester) during the performance of the test. This may include logging any keystrokes, typed words/characters/numbers/symbols, deletion of words/characters/numbers/symbols, and/or any other keyboard input.

Further, snapshots of one or more screen segments associated with one or more of the plurality of test steps are recorded. See operation 308. The recording of the snapshots may include capturing any portion of any screen associated with the test. In one embodiment, a user may select the one or more screen segments and initiate the snapshots.

The recorded mouse movements, the recorded keyboard inputs, and the recorded screenshots, are stored in one or more files as a first test flow. See operation 310. In this way, a test flow of a test may be saved, including all activities performed during the course of the test, with associated inputs.

As shown further in FIG. 3, a selected one or more of the recorded keyboard inputs are replaced with one or more parameters to generate a keyboard testing input, each of the one or more parameters corresponding to a plurality of possible keyboard inputs. See operation 312. For example, a user may replace user selected input data used during a test run with a range of data to be tested during subsequent test runs. The keyboard testing input is the original recorded keyboard inputs, but with any replacements made by the user.

The user may replace any number of keyboard inputs. Additionally, the parameters may include a variety of data. For example, the parameters may include a range of possible keyboard inputs.

In this case, the range of possible keyboard inputs may include a numerical range, a range of numbers between a minimum number and a maximum number, and/or a range of string sizes between a minimum number and a maximum number, etc. Additionally, the parameters may include a plurality of possible values (e.g. a list of possible values, etc.). For example, the parameters may include a list of possible numerical values, a list of possible characters, or a list of possible character strings, etc.

Further, in one embodiment, an indication of a test duration may be received from a user. In this case, the indication of the test duration may include an indication of an execution duration (e.g. in minutes, hours, days, etc.) or a number of test iterations to perform.

With further reference to FIG. 3, execution is triggered of the first test flow including the recorded mouse movements, the recorded screenshots, and the keyboard testing input. See operation 314. Moreover, the first test flow is executed utilizing a random selection of the plurality of possible keyboard inputs of the keyboard testing input. See operation 316.

In one embodiment, each of the plurality of possible keyboard inputs may be associated with a unique value. In this case, executing the first test flow utilizing the random selection of the plurality of possible keyboard inputs may include utilizing a random number generator to select the possible keyboard inputs, based on the unique value. Executing the test flow utilizing the random selection of the possible keyboard inputs functions to execute the first test flow utilizing a range of various parameters.

In one embodiment, as a result of execution, the recorded screenshots may be compared with other recorded screenshots generated from executing the first test flow utilizing the random selection of the plurality of possible keyboard inputs of the keyboard testing input. In this case, a pass or a fail may be assigned to each particular parameter data permutation, based on the comparison.

Additionally, at least one output is provided for the execution of the first test flow. See operation 318. In one embodiment, at the end of an execution an output may be provided that includes a list of tests, each with the corresponding randomly selected inputs and the assigned status. The user may analyze the results to find patterns of 'good' or 'bad' data.

Utilizing the method 300, a user may implement a tool that functions to quickly capture a test flow and subsequently execute multiple different data permutations for the purposes of analyzing a larger amount of inputs in an efficient manner.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
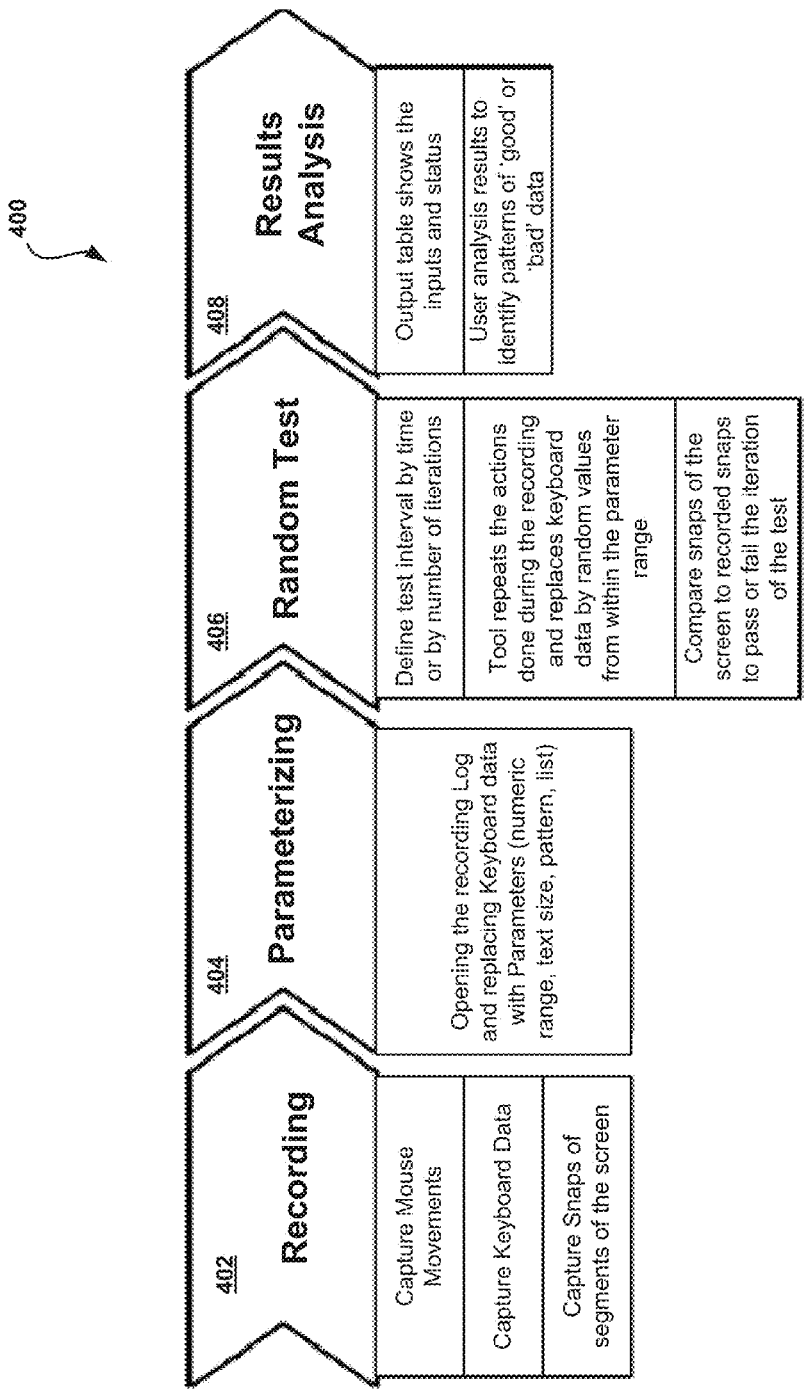
FIG. 4 illustrates a flow diagram for automated parameterized software testing, in accordance with one embodiment.

FIG. 4 illustrates a flow diagram 400 for automated parameterized software testing, in accordance with one embodiment. As an option, the flow diagram 400 may be implemented in the context of the details of FIGS. 1-3. Of course, however, the flow diagram 400 may be implemented in the context of any desired environment. Further, the aforementioned definitions may equally apply to the description below.

As shown in FIG. 4, the automated software testing flow diagram 400 includes a recording step 402, a parameterization step 404, a random test step 406, and a results analysis step 408.

For recording, while executing steps in the operation of a software product to be tested, a user may utilize an automated software testing tool or system to record a log of all mouse movements and keyboard data. Additionally, the user may record snapshots of segments of screens of the software for later comparison with subsequent execution of the software. The recording is then saved in a file which can later be loaded.

Thereafter, in the parameterization step, the user may access the recording and may replace keyboard data with parameters. Multiple types of parameters may be utilized, such as a Values List (e.g. ['Jone','Bob','Rina'], etc.), a Min-Max Number Range (e.g. <200:400>, etc.), a Min-Max String Size (e.g. {2-8}, etc.), and/or a String Format (e.g. "Ab$$$$$Q", where $ is a wildcard, or "00####12###", where # is 0-9, etc.), etc.

For random test execution, the user may trigger the execution of a previously recorded file, such as a file recorded during the recording step 402, either for a predetermined execution duration or for a number of iterations. The process executes the recorded flow using a random number generator to select a value for each parameter designated by the user in the parameterization step 404. The system compares the snapshots taken during the test execution to the snapshot recorded by the user in the recording step 402 to assign a 'Pass' or 'Fail' state to each data permutation.

For results analysis, the system may end an execution by providing an output including a list of tests, each with the corresponding randomly selected inputs and the assigned status. The user may analyze the results to find patterns of 'good' or 'bad' data.

In one embodiment, the automated software testing system may be installed on a local PC (or any user device) of a user/tester. In this case, the system may not require any shared or local database.

The system may implement a graphical user interface (GUI) to allow users to perform all functions supported by the system, as described herein. In one embodiment, the system may not require any security of users, as all data may be locally saved on the PC.

In operation, once opened, the GUI may allow a user to create a new recording and to load an existing recording. In one embodiment, the GUI may include an area for presenting the recorded log list of actions including the various attributes for each action. Such attributes may include, for example, delay, action type (mouse, keyboard, snapshot), location on screen, and/or value, etc.

Figure 5:
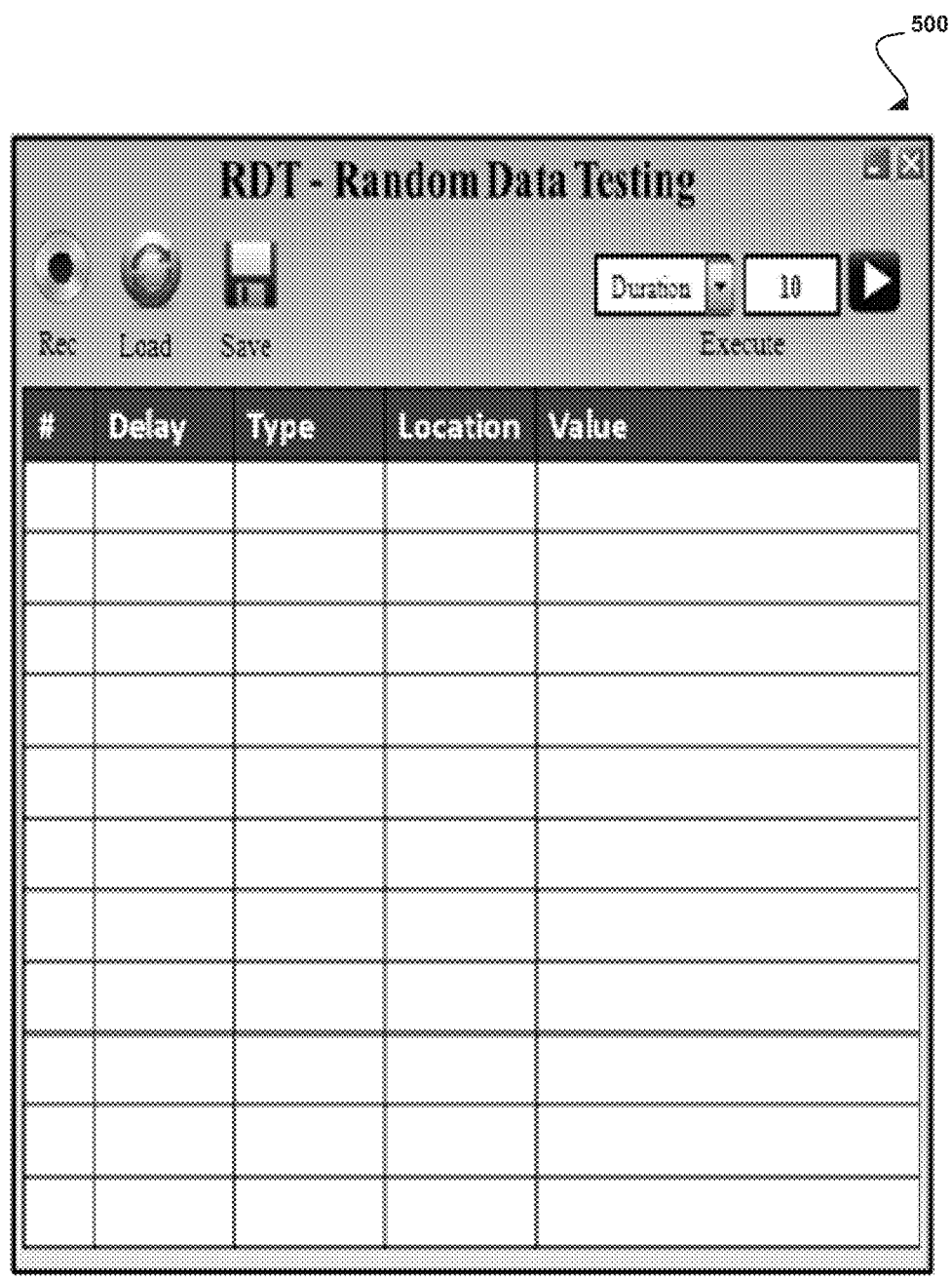
FIG. 5 illustrates a graphical user interface (GUI) for automated parameterized software testing, in accordance with one embodiment.

FIG. 5 illustrates a graphical user interface (GUI) 500 for automated parameterized software testing, in accordance with one embodiment. As an option, the GUI 500 may be implemented in the context of the details of FIGS. 1-4. Of course, however, the GUI 500 may be implemented in the context of any desired environment. Further, the aforementioned definitions may equally apply to the description below.

Once a user wishes to create a new recording, an empty file may be created on the local device of the user. In one embodiment, the user may be prompted to assign the recording a name, which may optionally be used as a file name.

Every recording may start with a snapshot that may be used to allow the tool to determine whether starting conditions are met when execution starts. As an option, the snapshot and associated details may be saved as the first line of the recording. In one embodiment, in case a user does not take a snapshot at the start of the recording, the user may receive error message explaining this initial mandatory step.

In one embodiment, to take a snapshot in the initial stage and at any other stage during the recording process, the user may press a specific key (e.g. the 'F2' key, etc.). The user may then mark one corner by clicking the left mouse key, and mark the opposite corner of the rectangle by dragging the mouse and re-clicking.

Mouse and keyboard inputs may each be logged in separate lines in the file with all relevant details. Also, keyboard typing may be accumulated as one action from the moment the user starts typing until a movement of the mouse occurs, the button is clicked to take a snapshot, or recording is terminated (e.g. by pressing the Esc key, etc). In one embodiment, pressing the 'F2' key and marking the rectangle at any point may allow the user to take additional snapshots for added comparison points in the recording flow.

Between each action, the system may measure the delay in seconds and log it so that the iterations may execute the flow at the same speed as it was originally executed by the user. A first delay may be logged as the time from the moment the user initiated the recording until performing the first action. In one embodiment, clicking on 'Esc' may stop the recording at any stage.

Once the user has pressed 'Esc' the system may compare the initial snapshot to the current state in the same place on the screen to ascertain whether the recording can be run in a loop or whether the user did not arrive back to the starting point. In case the user did not return to the starting point, the user may receive an alert that the recording is not circular. The system may still allow saving of the recorded file.

At the end of the recording, all steps in the file may be presented in the log area. The user may save his recording by pressing on a save button in the GUI.

For editing a recording, the user may load a saved file into the log area. Once presented, the user may select actions within the recording and delete them by pressing the delete button. In various embodiments, the system may support both single action delete and multiple action delete.

After presenting the file, the user may select a 'Continue Recording' option to resume the recording effort. This may allow the same functions listed above for initial recording. It may be the user's responsibility to ensure that his newly recorded segment links to the previously recorded actions in the file.

For parameterization, the user may edit the values in the recording log. The user does not have to define a parameter for all keyboard data, rather only for the keyboard data the user would like to execute with a wider range of options. When defining a parameter instead of a fixed value, the user may select one of a plurality of formats so that the system may identify the data as a parameter and not as a fixed value.

One format may include a Values List, which is a string parameter containing exact values which can be selected. The parameter may be identified by a list enclosed in parenthesis, such as ['value1', 'value2', 'value3', 'value4', . . . ]. Some examples include ['Jone','Bob', 'Rina'], ['B1','A0','T13z','12Pv'], and ['Yes','No'].

Another possible format may include a Min-Max Number Range, which is a numeric parameter limited by a Minimum value and a Maximum value to support selection of any number within the range of numbers and having the same precision as the minimum and maximum values. The range includes the minimum and maximum values themselves. To identify the parameter as a range it may be enclosed by brackets, such as <Minimum value:Maximum value>. Some examples include <200:400> (which supports 201 values), <200.00:400.00> (which supports 20001 values), and <−50: 49> (which supports 100 values).

Another format includes a Min-Max String Size, which is a string parameter which accepts any text within a length range, limited by a Minimum length and a Maximum length. The numbers represent the number of alphanumeric characters which can be placed within the generated text. Characters available for the text may include all ASCII defined characters. In this case, Minimum length and Maximum length may only be represented as positive round numbers. The two values may be the same number. To identify the parameter as a string size it may be enclosed by brackets as {Minimum value-Maximum value}. Examples of this include {2-8} (with possible outcomes: I9, Rd@3, aS3c^0El, x 4), and {1-1} (with possible outcomes: I,4, y, #, W), etc.

Another possible format may include a String Format, which is a string parameter that defines two symbols which, when appearing, may be replaced by a wider range of options. For example, $ may be a full wildcard, where during random selection the dollar sign may be replaced by any single character within the ASCII options. As another example, # may be a numeric digit between 0-9, where during random selection the pound sign may be replaced by any single digit between 0-9. Every appearance within the format may be separately randomly selected. Any other character in the format may be used "as is" in every iteration. To identify the parameter as a format it may be enclosed by quotation marks, such as "Ab$$$$$Q", "$$I1", "Is this a $$$$$$$?", or "00####12###", "You have ###### to go", or "$$##02$$84#", etc.

After entering parameters, the user can save the file which now includes the fixed actions and the parameterized data for selected keyboard actions. By reloading the file back, the user may always be able to edit and change parameters defined or return them to a fixed value, including a value other than the original value.

For execution, the user may load the file to execute. The GUI may include two fields of execution settings. For example, the fields may include an execution type, which may be a drop down field allowing a user to select between duration or iterations. The field may also include an execution value, which is a numeric field that accepts round positive numbers.

For duration based execution, the value may represent the number of minutes during which the execution should continue running. For iteration based execution, the value may represent the exact number of times the flow must run. The two fields may be used as inputs for a next test run. In one embodiment, these values may not be saved in the file. The GUI may include an "execute" button allowing a user to start the execution run.

Before starting the first iteration, the system may reduce the GUI screen size for the duration of the execution. Additionally, the system may compare the initial state in the recording with the current screen snap shot. If the states are equivalent, the system may allow the test to continue. If the states are not equivalent, the system may stop the execution and return an error message stating that the initial conditions are not met.

At the start of each iteration, the system may compare the initial state within the recording with the final state of the recording. If the states are equivalent, the system may allow the test to continue. If the states are not equivalent, the system may stop the execution and return an error message stating that the flow is not recursive.

In one embodiment, the system may create a results file corresponding to the execution which contains a table having a column for each parameter defined in the recording and a column for the status of the iterations. The parameter labels may include a number representing the step in which the parameter appears within the recording.

The system may follow the actions in the recording to repeat the same activities recorded, except for the keyboard data actions which were replaced by a parameter. When reaching a parameter, the system uses a random generator to select a random value from within the specified range of the parameter. Once selected, the value is placed in the results table under the column of the parameter, and then placed in the location where the original value was typed in on the screen in the original recording.

When reaching an action in the recording of type snapshot, the system may take a snapshot from the same location on the screen, of the same size, and compare the snapshot to the saved snapshot. If the comparison passes, the system checks the state of the iteration in the results file. If the file is empty, the result may be set as "passed". If the result is already set as "passed", the system may not modify the result. If the result is already set as "failed", the system may not modify the result. If the comparison fails, the system may mark the status of the iteration as failed. In both cases the system may continue to the next action of the recording, to complete the iteration and to return back to the starting point so to start the next iteration.

As iterations may cause unexpected errors, an execution may start from the cleanest state possible, with only the desktop presented, so that it may be easy to return to it even if a test failed. Further, the application may be closed at the end of the recording so that each iteration may perform the same step before moving to the next step, and if there was any error on the application it may not interfere with the next iteration. Additionally, a 'show desktop' button may be pressed as the last step of the recording to make sure that if, during the execution, any notification or popup screen opened it may not interfere with more than one iteration.

In one embodiment, the user may be able to open the file from a user device (e.g. a PC. Etc.), at the location of the system software, and may read the results therefrom. The user may analyze the results and look for patterns. In this way, the user may identify data related defects, which include defects that are only presented when using a specific type of data. This is an error type which is typically very hard to identify in normal manual/automated tests.

Further, the user may identify software limits of data that the system accepts, whether they were known during development or not. The user may also identify quality issues in a fix. For example, a software fix might have fixed a specific permutation of a flow but when examining it with other permutations it may show residual issues. Moreover, the user may prove wide data range stability for a functional flow to provide a strong stability indication on a critical flow for all types of data with which the flow must be measured.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:

during a flow executed by a computer system involving a plurality of screens being displayed to a user, creating, by the computer system, a test record for the flow, where the test record includes a recording of the flow and further includes:

a first user-taken snapshot of one of the screens displayed to the user;

mouse movements performed by the user over a first subset of the screens displayed to the user, keyboard inputs performed by the user over a second subset of the screens displayed to the user, and user-taken snapshots of a third subset of the screens displayed to the user;

storing, by the computer system as an executable test, the test record in one or more files, including storing an indication that the first user-taken snapshot is indicative of a start of the test;

storing, by the computer system in the test record, the indication of the first screen being the start of the test;

receiving, from the user by the computer system through the one or more files, a selection of one or more of the keyboard inputs to be parameterized, the selection for each of the one or more keyboard inputs including a user-specified variable parameter and a user-specified associated range of possible values;

for each of the selected keyboard inputs, replacing, by the computer system in the test record, the keyboard input with the user-specified variable parameter and the user-specified associated range of possible values;

after the replacing, receiving, by the computer system, a command from the user to execute the test;

responsive to the command:

(a) executing the test using the test record by the computer system including:

determining whether a initial screen displayed at the start of the test is equivalent to the first screen indicated in the test record as being the start of the test, responsive to determining that the initial screen displayed at the start of the test is not equivalent to the first screen indicated in the test record as being the start of the test, stopping execution of the test and returning an error to the user, responsive to determining that the initial screen displayed at the start of the test is equivalent to the first screen indicated in the test record as being the start of the test, performing the flow using the mouse movements recorded in the test record, the keyboard inputs recorded in the test record, and a random number generator that selects for each of the user-specified variable parameters in the test record a value from the user-specified associated range of possible values;

(b) recording, by the computer system, test snapshots taken by the computer system of the screens displayed during the execution of the test that correspond to the third subset of the screens for which the user-taken snapshots are stored in the test record;

(c) comparing the test snapshots to the user-taken snapshots stored in the test record; and (d) outputting, by the computer system results of the execution of the test for being accessed by the user including:

an indication of the selected value for each of the user-specified variable parameters, and an indication that the test has passed when the test snapshots match the user-taken snapshots stored in the test record or an indication that the test has failed when the test snapshots do not match the user-taken snapshots stored in the test record.

2. The computer program product of claim 1, wherein for one of the user-specified variable parameters the user-specified associated range of possible values includes a numerical range.

3. The computer program product of claim 1, wherein for one of the user-specified variable parameters the user-specified associated range of possible values includes a range of numbers between a minimum number and a maximum number.

4. The computer program product of claim 1, wherein for one of the user-specified variable parameters the user-specified associated range of possible values includes a range of string sizes between a minimum number and a maximum number.

5. The computer program product of claim 1, wherein the user-specified associated range of possible values include a list of possible values.

6. The computer program product of claim 5, wherein the list of possible values includes at least one of a list of possible numerical values, a list of possible characters, or a list of possible character strings.

7. The computer program product of claim 1, further comprising:

repeating (a)-(d) for another iteration of the execution of the test where the flow is performed using a different value selected by the random number generator for each of the user-specified variable parameters in the test record.

8. The computer program product of claim 1, wherein receiving the command to execute the test includes receiving an indication of a duration over which iterations of the test are to be executed.

9. The computer program product of claim 8, wherein the indication of the duration includes a length of time.

10. The computer program product of claim 8, wherein the indication of the duration includes a number of iterations of the test that are to be executed.

11. A method, comprising:

during a flow executed by a computer system involving a plurality of screens being displayed to a user, creating, by the computer system, a test record for the flow, where the test record includes a recording of the flow and further includes:

a first user-taken snapshot of one of the screens displayed to the user;

mouse movements performed by the user over a first subset of the screens displayed to the user, keyboard inputs performed by the user over a second subset of the screens displayed to the user, and user-taken snapshots of a third subset of the screens displayed to the user;

storing, by the computer system as an executable test, the test record in one or more files, including storing an indication that the first user-taken snapshot is indicative of a start of the test;

storing, by the computer system in the test record, the indication of the first screen being the start of the test;

receiving, from the user by the computer system through the one or more files, a selection of one or more of the keyboard inputs to be parameterized, the selection for each of the one or more keyboard inputs including a user-specified variable parameter and a user-specified associated range of possible values;

for each of the selected keyboard inputs, replacing, by the computer system in the test record, the keyboard input with the user-specified variable parameter and the user-specified associated range of possible values;

after the replacing, receiving, by the computer system, a command from the user to execute the test;

responsive to the command:

(a) executing the test using the test record by the computer system including:

determining whether a initial screen displayed at the start of the test is equivalent to the first screen indicated in the test record as being the start of the test, responsive determining that the initial screen displayed at the start of the test is not equivalent to the first screen indicated in the test record as being the start of the test, stopping execution of the test and returning an error to the user, responsive to determining that the initial screen displayed at the start of the test is equivalent to the first screen indicated in the test record as being the start of the test, performing the flow using the mouse movements recorded in the test record, the keyboard inputs recorded in the test record, and a random number generator that selects for each of the user-specified variable parameters in the test record a value from the user-specified associated range of possible values;

(b) recording, by the computer system, test snapshots taken by the computer system of the screens displayed during the execution of the test that correspond to the third subset of the screens for which the user-taken snapshots are stored in the test record;

(c) comparing the test snapshots to the user-taken snapshots stored in the test record; and (d) outputting, by the computer system results of the execution of the test for being accessed by the user including:
  an indication of the selected value for each of the user-specified variable parameters, and
  an indication that the test has passed when the test snapshots match the user-taken snapshots stored in the test record or an indication that the test has failed when the test snapshots do not match the user-taken snapshots stored in the test record.

12. A system comprising:

a memory system of a computer system; and one or more processing cores of the computer system that are coupled to the memory system and that are each configured for:

during a flow executed by the computer system involving a plurality of screens being displayed to a user, creating, by the computer system, a test record for the flow, where the test record includes a recording of the flow and further includes:
  a first user-taken snapshot of one of the screens displayed to the user;
  mouse movements performed by the user over a first subset of the screens displayed to the user,
  keyboard inputs performed by the user over a second subset of the screens displayed to the user, and
  user-taken snapshots of a third subset of the screens displayed to the user;

storing, by the computer system as an executable test, the test record in one or more files, including storing an indication that the first user-taken snapshot is indicative of a start of the test;

storing, by the computer system in the test record, the indication of the first screen being the start of the test;

receiving, from the user by the computer system through the one or more files, a selection of one or more of the keyboard inputs to be parameterized, the selection for each of the one or more keyboard inputs including a user-specified variable parameter and a user-specified associated range of possible values;

for each of the selected keyboard inputs, replacing, by the computer system in the test record, the keyboard input with the user-specified variable parameter and the user-specified associated range of possible values;

after the replacing, receiving, by the computer system, a command from the user to execute the test;

responsive to the command:

(a) executing the test using the test record by the computer system including:
  determining whether a initial screen displayed at the start of the test is equivalent to the first screen indicated in the test record as being the start of the test,
  responsive determining that the initial screen displayed at the start of the test is not equivalent to the first screen indicated in the test record as being the start of the test, stopping execution of the test and returning an error to the user,
  responsive to determining that the initial screen displayed at the start of the test is equivalent to the first screen indicated in the test record as being the start of the test, performing the flow using the mouse movements recorded in the test record, the keyboard inputs recorded in the test record, and a random number generator that selects for each of the user-specified variable parameters in the test record a value from the user-specified associated range of possible values;

(b) recording, by the computer system, test snapshots taken by the computer system of the screens displayed during the execution of the test that correspond to the third subset of the screens for which the user-taken snapshots are stored in the test record;

(c) comparing the test snapshots to the user-taken snapshots stored in the test record; and (d) outputting, by the computer system results of the execution of the test for being accessed by the user including:
  an indication of the selected value for each of the user-specified variable parameters, and
  an indication that the test has passed when the test snapshots match the user-taken snapshots stored in the test record or an indication that the test has failed when the test snapshots do not match the user-taken snapshots stored in the test record.

* * * * *